US006558566B2

(12) United States Patent
Ono et al.

(10) Patent No.: US 6,558,566 B2
(45) Date of Patent: May 6, 2003

(54) OXIDE MAGNETIC MATERIALS, CHIP COMPONENTS USING THE SAME, AND METHOD FOR PRODUCING OXIDE MAGNETIC MATERIALS AND CHIP COMPONENTS

(75) Inventors: Takuya Ono, Tokyo (JP); Ko Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 144 days.

(21) Appl. No.: 09/802,922

(22) Filed: Mar. 12, 2001

(65) Prior Publication Data

US 2001/0028051 A1 Oct. 11, 2001

(30) Foreign Application Priority Data

Mar. 13, 2000 (JP) ........................................ 2000-068199

(51) Int. Cl.⁷ .................................................. H01F 1/34
(52) U.S. Cl. ................ 252/62.6; 252/62.62; 252/62.63; 29/607; 29/608
(58) Field of Search ............................ 252/62.6, 62.62, 252/62.63; 29/607, 608

(56) References Cited

U.S. PATENT DOCUMENTS 6,033,594 A * 3/2000 Enokido et al. .......... 252/62.58
6,251,299 B1 * 6/2001 Ito et al. .................... 252/62.6
6,287,479 B1 * 9/2001 Tanaka .................... 252/62.59

FOREIGN PATENT DOCUMENTS

JP          9-63826      *  3/1997
JP          2001-6916    *  1/2001

* cited by examiner

Primary Examiner—C. Melissa Koslow
(74) Attorney, Agent, or Firm—Oblon, Spivak, McClelland, Maier & Neustadt, P.C.

(57) ABSTRACT

Ni—Cu—Zn based oxide magnetic materials, in that not only the internal conductor is stabilized at very low firing temperatures, but also the characteristics in the high frequency zones of 100 MHz or higher are excellent. The oxide magnetic materials comprises, $Fe_2O_3$: 35.0 to 51.0 mol %, CuO: 1.0 to 35 mol %, NiO: 38.0 to 64.0 mol %, ZnO: 0 to 10.0 mol % (including 0%) and Ca: 0.3 wt % or lower (not including 0%), and, optionally, CoO: 0.7 wt % or lower.

11 Claims, No Drawings

OXIDE MAGNETIC MATERIALS, CHIP COMPONENTS USING THE SAME, AND METHOD FOR PRODUCING OXIDE MAGNETIC MATERIALS AND CHIP COMPONENTS

BACKGROUND OF THE INVENTION

The present invention relates to chip components such as chip inductors or chip beads, or oxide magnetic materials to be used to components of shielding electromagnetic wave such as bulk typed inductors and a method of producing the same, as well as bulk typed coil components or laminated coil components using such oxide magnetic materials and a method of producing the same, and more specifically relates to oxide magnetic materials enabling to be fired at a melting point or lower of Ag used to internal conductors of the chip components, and a method of producing bulk or chip typed inductors using oxide magnetic materials having excellent high frequency characteristic.

Recently, remarkable developments of electronic or communicating devices construct new industrial structures, basing on miniaturization of electronic components, making them thin films and improvements of mounting them onto apparatus, but such developments of the industrial developments have had double sided tendency causing social problems by inducing new problems, that is, environmental and communicating troubles negligible at past ages.

In particular, because wireless-communicating devices has generally been used and electromagnetic circumstances are worsen, an electromagnetic interference regulation of each country has been strengthened. For example, it has been demanded to develop elements for canceling harmful electromagnetic waves (EMI/EMC) and components therefor have rapidly increased, while concurrently the complication of functions as to magnetic and temperature characteristics, high integration and wide frequency ranges have been developed toward high efficiency.

Incidentally, application ranges of the oxide magnetic materials to be used as blank materials of electronic components for elements canceling electromagnetic troubles, or used to components such as transformers for electric power are fractionalized per characteristic, for example, per frequency ranges. Additionally, with respect to production methods, studies of methods producing multilayer components have been actively advanced from a conventional powder metallurgical production method and reduced to practice, and today anchored as production techniques of miniaturized chip components in production fields of ceramic electronic components.

In general, the oxide magnetic materials to be used to chip inductors, chip LC filters and chip transformers necessitate high inductance, and such oxide magnetic materials are enumerated as Mn—Zn ferrite, Ni ferrite, Ni—Zn ferrite or Ni—Cu—Zn ferrite.

In a case of Mn—Zn ferrite, since permeability is high and electric power loss is very little, it is used to magnetic core materials of transformers for electric power source or core materials of filters for electric power lines, but since the high frequency characteristic is low, it is disadvantageously difficult to apply Mn—Zn ferrite in frequency ranges of 1 MHz or higher. At the present time, as the magnetic cores to be used in such high frequency ranges, there are applicable Ni ferrite, Ni—Zn ferrite or Ni—Cu—Zn ferrite.

On the other hand, a prior art method of producing the above mentioned oxide magnetic materials is carried out at about 1000 to 1400° C. for 1 to 5 hours in the firing procedure. Ag electrode is usually used to internal conductors of the electronic components such as the laminated chip inductors, but the baking temperature as mentioned above exceeds a melting point (960° C.) of Ag as the internal conductor, and the conventional method is involved with a problem that since Ag is melted and diffused in components produced under a very high temperature condition, a loss in the high frequency is very much, and therefore it is very difficult to realize a required inductance.

As an additive to be used for providing chips where the firing temperature is lowered so that the loss is little, CoO is ordinarily used as proposed in JP-A-9-63826. But CoO deteriorates the temperature characteristic of inductance in proportion to its adding amount and has a problem of affecting influences to reliability of products.

SUMMARY OF THE INVENTION

Accordingly, for solving the above mentioned problems involved with the prior art, it is an object of the invention to provide Ni—Cu—Zn based oxide magnetic materials, and chip components using the same, as well as a method of producing oxide magnetic materials and a method of producing chip components by adding such additives where if reacting with main components of a base material, the electromagnetic characteristic is deteriorated at minimum and the temperature characteristic of the inductance is deteriorated at minimum, whereby not only the internal conductor is stabilized at very low baking temperatures, but also the characteristics in the high frequency zones of 100 MHz or higher are excellent.

For accomplishing the above mentioned object, the invention is to offer the oxide magnetic materials of the following (1) to (9) and the chip components using the oxide magnetic materials as well as the method of producing the oxide magnetic materials and the method of producing the chip components.

(1) The oxide magnetic materials are composes, $Fe_2O_3$: 35.0 to 51.0 mol %, CuO: 1.0 to 35.0 mol %, NiO: 38.0 to 64.0 mol %, and ZnO: 0 to 10.0 mol % (including 0%).

(2) The oxide magnetic materials as set forth in the above (1), contains Ca: 0.3 wt % or lower (not including 0%).

(3) The oxide magnetic materials as set forth in the above (2), contains CoO: 0.7 wt % or lower (not including 0%).

(4) A method of producing oxide magnetic materials is characterized in that oxide magnetic materials composed of, $Fe_2O_3$: 35.0 to 51.0 mol %, CuO: 1.0 to 35.0 mol %, NiO: 38.0 to 64.0 mol %, and ZnO: 0 to 10.0 mol % (including 0 mol %), are contained with $Ca_3$ $(PO_4)_2$ 0.5 wt % (not including 0%), and the oxide magnetic materials are fired.

(5) The method of producing oxide magnetic materials as set forth in the above (4), is characterized by containing CoO: 0.7wt % or lower and, the oxide magnetic materials are fired.

(6) Chip components are characterized in that bulk typed coil components are structured by using sintered bodies of oxide magnetic materials containing, $Fe_2O_3$: 35.0 to 51.0 mol %, CuO: 1.0 to 35.0 mol %, NiO: 38.0 to 64.0 mol %, and ZnO: 0 to 10.0 mol % (including 0%), or sintered bodies of the magnetic materials further containing Ca 0.3 wt % or lower (not including 0%), or containing Ca 0.3 wt % or lower (not including 0%) and CoO 0.7 wt % or lower (not including 0%).

(7) Chip components are characterized in that laminated coil components are structured by using sintered bodies of oxide magnetic materials containing, $Fe_2O_3$: 35.0 to 51.0 mol %, CuO: 1.0 to 35.0 mol %, NiO: 38.0 to 64.0 mol %, and ZnO: 0 to 10.0 mol % (including 0%), or sintered bodies of the oxide magnetic materials further containing Ca 0.3 wt % or lower (not including 0%), or containing Ca 0.3 wt % or lower (not including 0%) and CoO 0.7 wt % or lower (not including 0%), and said oxide magnetic materials having electrically conductive layers in the sintered bodies.

(8) The chip components as set forth in the above (7) are characterized in that an internal conductor is composed of a conductor having main components of Ag or Ag—Pd alloy.

(9) A method of producing chip components, using sintered bodies of oxide magnetic material containing, $Fe_2O_3$: 35.0 to 51.0mol %, CuO: 1.0 to 35.0 mol %, NiO: 38.0 to 64.0mol %, and ZnO: 0 to 10.0 mol % (including 0%), or sintered bodies of the magnetic materials further containing Ca 0.3 wt % or lower (not including 0%), or containing Ca 0.3 wt % or lower (not including 0%) and CoO 0.7 wt % or lower (not including 0%), and employing in the sintered bodies, as electrically conductive layers or electrical conductors, conductors having main components of Ag or Ag—Pd alloy, is characterized by baking ground oxide magnetic materials and the internal conductors at 880 to 920° C.

Thus, the following working effects can be exhibited.

(1) It is possible to obtain the oxide magnetic material which is small in an initial permeability, large in a sintered density, little in eddy current loss, and available in firing at low temperature in the high frequency range of 100 MHz or higher where the inventive products are used.

(2) It is possible to obtain the oxide magnetic material which is low in the initial permeability, large in the sintered density, and excellent in the temperature characteristics of the inductance by adding Ca 0.3 wt % or lower.

(3) It is possible to obtain the oxide magnetic material which is small in the initial permeability, large in the sintered density, and excellent in the temperature characteristics of the inductance by adding Ca 0.3 wt % or lower and further CoO 0.7 wt % or lower.

(4) It is possible to obtain the oxide magnetic material which is low in the initial permeability, large in the sintered density, and excellent in the temperature characteristics of the inductance by adding $Ca_3(PO_4)_2$ 0.5 wt % or lower.

(5) It is possible to obtain the oxide magnetic material which is low in the initial permeability, large in the sintered density, and excellent in the temperature characteristics of the inductance by adding CoO 0.7 wt % or lower other than $Ca_3(PO_4)_2$ 0.5 wt % or lower.

(6) As the chip component is composed with the oxide magnetic material which is low in the initial permeability, large in the sintered density, and excellent in the temperature characteristics of the inductance, it is possible to offer the chip component which is excellent in these respective characteristics.

(7) As the laminated coil component is composed with the oxide magnetic material which is low in the initial permeability, large in the sintered density, excellent in the temperature characteristics of the inductance, and low at the baking temperature, it is possible to offer the laminated component which is excellent in these respective characteristics and superior in a quality factor Q.

(8) As the chip component is composed with the conductor where the internal conductor has the main component of Ag or Ag—Pd alloy, using the oxide magnetic material which is low in the initial permeability, large in the sintered density, excellent in the temperature characteristics of the inductance, and low at the baking temperature, it is possible to offer the chip component which is excellent in these respective characteristics and superior in a quality factor Q.

(9) As the chip component is composed by the steps of using the oxide magnetic material which is low in the initial permeability, large in the sintered density, and excellent in the temperature characteristics of the inductance, and which has the conductor as the internal conductor of the main component being Ag or Ag—Pd alloy, and baking at 880 to 920° C., it is possible to offer the chip component which is excellent in these respective characteristics and superior in a quality factor Q.

DETAILED DESCRIPTION OF THE PREFERRED EMBODIMENTS

Reference will be made to one example of the invention. The magnetic materials are generally different in the characteristics by the frequency zones in accordance with the compositions. In the invention, in the high frequency zones of 100 MHz or higher where the invention products are used, Ni—Cu—Zn ferrite to be adapted is soft magnetic ferrite where ZnO is low while NiO is relatively much.

One mode for carrying out the invention is to offer the oxide magnetic materials containing, $Fe_2O_3$: 35.0 to 51.0 mol %, CuO: 1.0 to 35.0 mol %, NiO: 38.0 to 64.0 mol %, and ZnO: 0 to 10.0 mol % (including 0%) in Ni—Cu—Zn based oxide magnetic material.

So far as affecting no influences to the characteristics such as the permeability, the sintered density or temperature characteristic of the inductance, Si, Al, B, Mn, Mg, Ba, Sr, Bi, Pb, W, V or Mo may be included as impurities.

Thereby, it is possible to obtain the oxide magnetic material having the characteristics of the initial permeability being 25 or lower, the sintered density being 4.75 $g/cm^3$ or higher and the temperature characteristic of the inductance being within ±20%.

If $Fe_2O_3$ as a main phase is less than 35.0 mol %, the sintered density is less than 4.75 $g/cm^3$, while being more than 51.0 mol %, an electric resistance rate is lowered and the eddy current loss is increased, resulting in increasing the magnetic loss.

CuO is effective in accelerating the sintering at low temperatures, and in this sense, an increasing amount, is good, but if being more than 35.0 mol %, CuO is precipitated as a heterophase at a grain boundary, and grain boundary stress is generated to deteriorate the temperature characteristic of the inductance. If CuO is less than 1 mol %, the sintered density is deteriorated.

ZnO gives influences to the initial permeability. The frequency characteristics depend on the initial permeability, and the high the requisite frequency zone, it is necessary to control the initial permeability to be low. The initial permeability is preferably 25 or lower, more preferably 18 or lower, and further more preferably 13 or lower. Since the initial permeability becomes higher in proportion to the ZnO containing amount, ZnO is 10 mol % or lower in the oxide magnetic material to be used in the zones of 100 MHz to 500 MHz.

Therefore, it is necessary that NiO is relatively 38.0 to 64.0 mol % for substituting for the resting balance.

Further, in the above mentioned Ni—Cu—Zn based oxide magnetic material, that is, in the oxide magnetic material composed of, $Fe_2O_3$: 35.0 to 51.0 mol %, CuO: 1.0 to 35.0 mol %, NiO: 38.0 to 64.0 mol %, and ZnO: 0 to 10.0 mol %, the invention contains Ca 0.3 wt % or lower, or Ca 0.3 wt % or lower and CoO 0.7 wt % or lower, or $Ca_3(PO_4)_2$ 0.5 wt % or lower and fires, or $Ca_3(PO_4)$ 0.5 wt % and CoO 0.7 wt % or lower and fires.

Examples of the invention will be referred to. The substance containing, as the main components of Ni—Cu—Zn ferrite, that is, as the main components of the oxide magnetic material, NiO 45.5 mol %, CuO 6.0 mol %, ZnO 0 mol % and $Fe_2O_3$ 48.5 mol %, was wet-mixed by the media agitating mill of a wet internal circulation type, using Partially Stabilized Zirconia (PSZ) of 3 mm diameter as the media beads, and calcined at 780° C. after drying.

Subsequently, using the PSZ balls as the media beads, the calcined substance was made 33% in the density by the media agitating mill of the wet internal circulation type, and finely ground. Then, CoO, $Ca_3(PO_4)_2$, Ca and P were selected as shown in Table 1 and added to the above mentioned calcined substance, and finely ground. By the way, CoO, Ca and P in Table 1 show those added with $Co_3O_4$, $CaCO_3$ and $P_2O_5$.

When the average diameter of the material became 0.5 $\mu$m, that is, when the specific surface area became 8 m²/g, it was dried to produce the final powder.

The dried powder was passed through a filter for taking out the average grains, to which a 3% water solution of PVA124 was added as a binder, granulated, molded into desired shapes under later mentioned conditions, and fired at 910° C. for two hours in the air.

TABLE 1A

| Examples | Amount of addition (wt %) | | | |
|---|---|---|---|---|
| | CoO | $Ca_3(PO_4)_2$ | Ca | P |
| Sample 1 | | | | |
| Sample 2 | 0.70 | | | |
| Sample 3 | 0.75 | | | |
| Sample 4 | 1.00 | | | |
| Sample 5 | | | 0.025 | |
| Sample 6 | | | 0.05 | |
| Sample 7 | | | 0.10 | |
| Sample 8 | | | 0.20 | |
| Sample 9 | | | 0.30 | |
| Sample 10 | | | 0.40 | |
| Sample 11 | | | | 0.025 |
| Sample 12 | | | | 0.05 |
| Sample 13 | | | | 0.10 |
| Sample 14 | | 0.0025 | | |
| Sample 15 | | 0.005 | | |
| Sample 16 | | 0.05 | | |
| Sample 17 | | 0.10 | | |
| Sample 18 | | 0.50 | | |
| Sample 19 | | 1.00 | | |
| Sample 20 | 0.70 | | 0.10 | |
| Sample 21 | 0.70 | | 0.20 | |
| Sample 22 | 0.50 | 0.0025 | | |
| Sample 23 | 0.65 | 0.005 | | |
| Sample 24 | 0.50 | 0.10 | | |
| Sample 25 | 0.70 | 0.10 | | |
| Sample 26 | 1.00 | 0.10 | | |

TABLE 1B

| Ex. | Initial permeability $\mu i$ | Sintered density (g/cm³) | Temperature characteristics of inductance (%) | | Remarks |
|---|---|---|---|---|---|
| | | | −20~20° C. | 20~80° C. | |
| Sam. 1 | 20.9 | 5.03 | 5.00 | 3.38 | Inv. |
| Sam. 2 | 14.5 | 5.11 | 21.56 | 13.45 | Com. |
| Sam. 3 | 14.3 | 5.11 | 24.48 | 15.39 | Com. |
| Sam. 4 | 11.1 | 5.04 | 29.04 | 36.38 | Com. |
| Sam. 5 | 20.1 | 5.08 | 4.86 | 4.06 | Inv. |
| Sam. 6 | 19.4 | 5.01 | 4.43 | 3.54 | Inv. |
| Sam. 7 | 17.8 | 4.95 | 3.12 | 2.38 | Inv. |
| Sam. 8 | 16.7 | 4.86 | 2.44 | 1.95 | Inv. |
| Sam. 9 | 15.9 | 4.77 | 1.89 | 1.14 | Inv. |
| Sam. 10 | 13.2 | 4.72 | 1.01 | 0.56 | Com. |
| Sam. 11 | 12.8 | 4.65 | −1.21 | 0.37 | Com. |
| Sam. 12 | 10.1 | 4.31 | −0.90 | −0.45 | Com. |
| Sam. 13 | 6.7 | 3.68 | −0.45 | −1.00 | Com. |
| Sam. 14 | 20.4 | 5.14 | 4.36 | 3.60 | Inv. |
| Sam. 15 | 20.2 | 5.13 | 4.03 | 3.29 | Inv. |
| Sam. 16 | 16.7 | 4.94 | 2.26 | 1.22 | Inv. |
| Sam. 17 | 16.0 | 4.93 | 1.98 | 1.16 | Inv. |
| Sam. 18 | 12.8 | 4.76 | 1.17 | 0.32 | Inv. |
| Sam. 19 | 9.6 | 4.58 | 0.36 | −0.52 | Com. |
| Sam. 20 | 14.0 | 4.91 | 19.01 | 11.44 | Inv. |
| Sam. 21 | 12.9 | 4.82 | 18.12 | 10.88 | Inv. |
| Sam. 22 | 15.0 | 5.11 | 4.78 | 6.02 | Inv. |
| Sam. 23 | 14.3 | 5.10 | 11.34 | 7.64 | Inv. |
| Sam. 24 | 12.4 | 4.80 | 2.89 | 7.44 | Inv. |
| Sam. 25 | 11.7 | 4.88 | 19.57 | 11.51 | Inv. |
| Sam. 26 | 9.1 | 4.71 | 24.75 | 30.44 | Com. |

Ex.: Examples Inv.: Inventive example Com.: Comparative example Sam.: Sameple

Sample 1 of Table 1 was produced in that the calcined and finely ground main components were not added with additives, but granulated similarly as above mentioned, molded and fired at 910° C. for two hours in the air.

Samples 2 to 4 were produced in that the calcined and finely ground main components were added with additives of $Co_3O_4$ in the amounts shown in Table 1 in terms of CoO, granulated similarly as above mentioned, molded and fired.

Samples 5 to 10 were produced in that the calcined and finely ground main components were added with additives of $CaCO_3$ in the amounts shown in Table 1 in terms of Ca, granulated similarly as above mentioned, molded and fired.

Samples 11 to 13 were produced in that the calcined and finely ground main components were added with additives of $P_2O_5$ in the amounts shown in Table 1 in terms of P, granulated similarly as above mentioned, molded and fired.

Samples 14 to 19 were produced in that the calcined and finely ground main components were added with additives of $Ca_3(PO_4)_2$ in the amounts shown in Table 1, granulated similarly as above mentioned, molded and fired.

When $Ca_3(PO_4)_2$ is added, for example, 0.5 wt % as shown in Sample 18, Ca exists 0.2 wt % and P exists 0.1 wt % in the oxide magnetic material after baking.

Samples 20 and 21 were produced in that the calcined and finely ground main components were added with additives of $CO_3O_4$ and $CaCO_3$ in the amounts shown in Table 1 in terms of CoO and Ca, granulated similarly as above mentioned, molded and fired.

Samples 22 and 26 were produced in that the calcined and finely ground main components were added in complex with additives of $CO_3O_4$ in the amount shown in Table 1 in terms of CoO and $Ca_3(PO_4)_2$ in the amount shown in Table 1, granulated similarly as above mentioned, molded and fired.

The evaluation of the magnetic material was carried out by evaluating the initial permeability shown in Table 1, apparent density, and the temperature characteristic of the inductance.

The initial permeability and the temperature characteristic of the inductance were measured by the steps of molding into toroidal shapes of 18 mm outer diameter×10 mm inner diameter×3.1 mm height, baking at the above mentioned predetermined temperatures in the air, winding a wire 20 times to actually produce coils, exerting a magnetic field 0.4 A/m by an impedance analyzer (4291A made by Hewlett Packard Inc.), measuring the inductance of 100 KHz, and calculating constants obtained from the shapes.

Herein, the initial permeability is for observing the high frequency characteristics of the sintered product. The lower the initial permeability, the peak frequency is shifted toward the high frequency. The initial permeability for obtaining the characteristics in the frequency zones satisfying the conditions of the invention is preferably 25 or lower (100 MHz zone), more preferably 18 or lower (300 MHz zone), and furthermore preferably 13 or lower (500 MHz).

With respect to the temperature characteristic of the inductance, when measuring the characteristic of the sintered product, the temperatures were changed between −20 and +80° C. in reference to the inductance value L at 20° C., and from the changing rate (ΔL/L) in relation with the reference inductance value L at the respectively obtained temperatures, the temperature characteristic of the inductance was demanded, and since thus it has per se the relation with the reliability, the changing rate should be controlled to the most. The temperature characteristic of the inductance enabling to secure the reliability is preferably within ±20%, more preferably ±15%.

The apparent density was obtained by demanding a volume from the dimension of the sintered material and dividing the mass with the volume. The apparent density is for seeing "good" or "bad" of the sintered degree. If the apparent density is low, it shows that many vacancies are within the sintered substance. If making the elements of materials having the low apparent density, problems will occur that the reliability is affected with influences as a short badness by such vacancies, or physical strength is made brittle. The apparent density of not generating the problems is in general 4.75 g/cm$^3$ or higher which is 90% or higher of the theoretical density 5.24 g/cm$^3$ of Ni—Cu—Zn ferrite.

From the above mentioned, the followings are apparent.

Sample 1, that is, the basic composition of the invention has the characteristics of the initial permeability being small as lower than 25, the sintered density having a larger value as more than 4.75g/cm$^3$, and the temperature characteristic being lower than ±20%.

As shown in Samples 2 to 4, even if CoO is singly added to the basic composition, the temperature characteristic of the inductance is large outside of the range of the invention.

As shown in Samples 5 to 9, when Ca is 0.3 wt % or lower (not including 0%), the initial permeability, the sintered density and temperature characteristic of the inductance satisfy the above mentioned predetermined values, but as shown in Sample 10, if Ca is more than 0.3 wt %, the sintered density becomes small and does not satisfy the predetermined value.

As shown in Samples 11 to 13, even if P is singly added, the sintered density is small and does not satisfy the predetermined value.

As shown in Samples 14 to 18, when adding $Ca_3(PO_4)_2$ 0.5 wt % or lower (not including 0%) and baking it, the initial permeability, the sintered density and temperature characteristic of the inductance satisfy the above mentioned predetermined values, but as shown in Sample 19, if $Ca_3(PO_4)_2$ is more than 0.5 wt %, the sintered density becomes small and does not satisfy the predetermined value.

As shown in Samples 20 and 21, if adding CoO 0.7 wt % or lower to the products including Ca 0.3 wt % or lower, the products have the small initial permeability, the large sintered density and the excellent temperature characteristic of the inductance.

As shown in Samples 22 to 25, when adding $Ca_3(PO_4)_2$ 0.5 wt % or lower and CoO is 0.7wt % or lower, the initial permeability, the sintered density and temperature characteristic of the inductance satisfy the predetermined values, but as shown in Sample 26, if CoO is more than 0.7 wt %, the sintered density becomes smaller than the predetermined value and temperature characteristic of the inductance becomes large, and the characteristics exceed the predetermined values and do not satisfy the predetermined values.

The core for the bulk typed coils according to the invention is, as mentioned above, produced by adding the binder to the calcined and wet-ground oxide magnetic material, granulating, molding into the predetermined shape, processing and baking at 900 to 1300° C. in the air. Incidentally, the core may be processed after baking. Subsequently, onto the core, wound is a wire composed of Au, Ag, Cu, Fe, Pt, Sn, Ni, Pb, Al, Co, or alloys thereof.

In contrast, the laminated coil is produced through the ordinary procedure of integrally laminating the magnetic layer paste of the oxide magnetic material and the internal electrical conductive layer by a thick film technique such as a printing method or a doctor blade method, baking, and printing and baking the paste for the external electrodes on the provided sintered surface. The paste for the internal electrodes usually contains electrically conductive elements, binder and solvent. The material of the electrically conductive element is suitably Ag or Ag.Pd alloy for the reason why the quality factor Q of the inductor is heightened. The baking condition or the baking atmosphere may be appropriately determined in response to materials of the magnetic substance or the conductive element. The baking temperature is preferably 800 to 950° C., more preferably 880 to 920° C. In case the baking temperature is lower than 880° C., the sintering is easily insufficient, and a long period of baking time is required, while exceeding 920° C., an electrode material is easily diffused to worsen the electromagnetic characteristic of the chip, and so the baking is done in a short time. In case of being lower than 800° C., the sintering is bad, and exceeding 950° C., the electrode material is diffused. Thus, the baking is 880 to 920° C.×5 minutes to 3 hours.

In dependence on the invention, the following effects can be exhibited.
(1) It is possible to obtain the oxide magnetic material which is small in the initial permeability, large in the sintered density, little in eddy current loss, and available in baking at low temperature in the high frequency zone of 10 MHz or higher.
(2) It is possible by adding Ca 0.3 wt % or lower to obtain the oxide magnetic material which is low in the initial permeability, large in the sintered density, and excellent in the temperature characteristics of the inductance.
(3) It is possible by adding Ca 0.3 wt % or lower and CoO 0.7 wt % or lower to obtain the oxide magnetic material which is small in the initial permeability, large in the sintered density, and excellent in the temperature characteristics of the inductance.
(4) It is possible by adding $Ca_3(PO_4)_2$ 0.5wt % or lower to obtain the oxide magnetic material which is low in the initial permeability, large in the sintered density, and excellent in the temperature characteristics of the inductance.

(5) It is possible by adding CoO 0.7 wt % or lower other than Ca$_3$(PO$_4$)$_2$ 0.5 wt % or lower to obtain the oxide magnetic material which is low in the initial permeability, large in the sintered density, and excellent in the temperature characteristics of the inductance.

(6) As the chip component is composed with the oxide magnetic material which is low in the initial permeability, large in the sintered density, and excellent in the temperature characteristics of the inductance, it is possible to offer the chip component which is excellent in these respective characteristics.

(7) As the laminated coil component is composed with the oxide magnetic material which is low in the initial permeability, large in the sintered density, excellent in the temperature characteristics of the inductance, and low at the baking temperature, it is possible to offer the multi-layer component which is excellent in these respective characteristics and superior in a quality factor Q.

(8) As the chip component is composed with the conductor where the internal conductor has the main component of Ag or Ag.Pd alloy, using the oxide magnetic material which is low in the initial permeability, large in the sintered density, excellent in the temperature characteristics of the inductance, and low at the baking temperature, it is possible to offer the chip component which is excellent in these respective characteristics and superior in a quality factor Q.

(9) As the chip component is composed by the steps of using the oxide magnetic material which is low in the initial permeability, large in the sintered density, and excellent in the temperature characteristics of the inductance, and which has the conductor as the internal conductor of the main component being Ag or Ag.Pd alloy, and baking at 880 to 920° C., it is possible to offer the chip component which is excellent in these respective characteristics and superior in a quality factor Q.

What is claimed is:

1. An oxide magnetic material comprising:

Fe$_2$O$_3$ of 35.0 to 51.0 mol %;

CuO of 1.0 to 35.0 mol %;

NiO of 38.0 to 64.0 mol %;

ZnO of 0 to 10.0 mol % (including 0 mol %);

and Ca of 0.3 wt % or lower (not including 0%).

2. The oxide magnetic material as claimed in claim 1, further comprising CoO of 0.7 wt % or lower (not including 0%).

3. A method of producing oxide magnetic materials, comprising:

providing an oxide magnetic material comprising Fe$_2$O$_3$ of 35.0 to 51.0 mol %, CuO of 1.0 to 35.0 mol %, NiO of 38.0 to 64.0 mol %, and ZnO of 0 to 10.0 mol % (including 0%);

adding Ca$_3$(PO$_4$)$_2$ of 0.5 wt % or lower (not including 0%) to the oxide magnetic material; and firing the oxide magnetic material.

4. The method of producing oxide magnetic materials as claimed in claim 3, further comprising adding CoO of 0.7 wt % or lower.

5. Bulk typed chip components comprising:

sintered bodies of oxide magnetic materials comprising Fe$_2$O$_3$ of 35.0 to 51.0 mol %, CuO of 1.0 to 35.0 mol %, NiG: 38.0 to 64.0 mol %, ZnO of 0 to 10.0 mol % (including 0%) and Ca of 0.3 wt % or lower (not including 0%).

6. The bulk typed chip component as claimed in claim 5, wherein said sintered bodies of the magnetic material further comprises CoO of 0.7 wt % or lower (not including 0%).

7. Laminated coil component comprising:

sintered bodies of oxide magnetic materials comprising Fe$_2$O$_3$ of 35.0 to 51.0 mol %, CuO of 1.0 to 35.0 mol %, NiO: 38.0 to 64.0 mol %, ZnO of 0 to 10.0 mol % (including 0%) and Ca of 0.3 wt % or lower (not including 0%).

8. The laminated coil component as claimed in claim 7, wherein said sintered bodies of the magnetic material further comprises CoO of 0.7 wt % or lower (not including 0%).

9. The laminated coil component as claimed in claim 7, further comprising an internal conductor composed of a conductor having main components of Ag or Ag—Pd alloy.

10. A method of producing chip components comprising:

providing sintered bodies of an oxide magnetic material comprising Fe$_2$O$_3$ of 35.0 to 51.0 mol %, CuG of 1.0 to 35.0 mol %, NiO of 38.0 to 64.0 mol %, and ZnO of 0 to 10.0 mol % (including 0%), adding Ca of 0.3 wt % or lower (not including 0%) to the sintered bodies; providing internal conductors having main components of Ag or Ag—Pd alloy in the sintered bodies as electrically conductive layers or electrical conductors; and firing the oxide magnetic material and the internal conductors at 880 to 920° C.

11. The method of producing chip components as claimed in claim 10, further comprising adding CoO of 0.7 wt % or lower.

* * * * *